(12) United States Patent
Kingsbury

(10) Patent No.: US 7,434,523 B2
(45) Date of Patent: Oct. 14, 2008

(54) SPEEDBOAT HULL DESIGN

(76) Inventor: Robert Kingsbury, P.O. Box 1099, Laconia, NH (US) 03247

( * ) Notice: Subject to any disclaimer, the term of this patent is extended or adjusted under 35 U.S.C. 154(b) by 0 days.

(21) Appl. No.: 11/509,829

(22) Filed: Aug. 24, 2006

(65) Prior Publication Data

US 2007/0051290 A1    Mar. 8, 2007

Related U.S. Application Data

(60) Provisional application No. 60/712,986, filed on Aug. 31, 2005.

(51) Int. Cl.
    *B63B 1/06*       (2006.01)
    *B63B 1/08*       (2006.01)
(52) U.S. Cl. .................................... 114/61.29; 114/272
(58) Field of Classification Search ................ 114/56.1, 114/61.1, 61.2, 61.27, 61.28, 61.29, 61.3, 114/61.31, 272, 273, 283
    See application file for complete search history.

(56) References Cited

U.S. PATENT DOCUMENTS

| | | | | |
|---|---|---|---|---|
| 394,416 A | * | 12/1888 | Tucker | .................. 114/61.32 |
| 514,835 A | * | 2/1894 | Mills | ......................... 114/61.3 |
| 4,046,092 A | * | 9/1977 | Tornqvist | ................. 114/61.31 |
| 5,549,066 A | * | 8/1996 | Kingsbury | ................. 114/56.1 |
| 6,427,615 B1 | * | 8/2002 | Ku | ........................... 114/77 R |
| 6,883,450 B2 | * | 4/2005 | Kingsbury | ................. 114/61.1 |
| 2002/0096098 A1 | * | 7/2002 | Kingsbury | ................. 114/61.1 |

* cited by examiner

Primary Examiner—Sherman Basinger
(74) Attorney, Agent, or Firm—William B. Ritchie

(57) ABSTRACT

A multi-hull speedboat hull design suitable for racing craft. The apparatus is a polygonal boat hull apparatus having a bow and stern wave penetrating feature. The bow has an additional triangular section to add strength and wave penetration capability. The hull is made from triangular-shaped essentially flat panels which provides for substantially stability and strength. The invention includes a drive pod system having a plurality of propulsion units. Each engine has a pair of hydro pneumatic cylinders that adjust the angle of attack of the propulsion unit. Each engine also has a pair of synchronized rudders. A top deck mounted aircraft-type of "tail assembly" having a rudder, elevators and/or ailerons assist in maneuvering the craft.

2 Claims, 5 Drawing Sheets

SPEEDBOAT HULL DESIGN

This application claims benefit of U.S. Provisional Application Ser. No. 60/712,986 filed Aug. 31, 2005 pursuant to 35 USC § 119(e)

FIELD OF THE INVENTION

The present invention relates to the field of boat hull designs, in particular, multi-hull designs.

BACKGROUND OF THE INVENTION

It is well known in the industry that watercraft with a multi-hull design provide better seakeeping in moderate-to-high wave conditions than mono-hull vessels. Multi-hull ships can be designed to experience only one-half to one-fifth of the heave, pitch, and roll motions of a monohull vessel of equal displacement in seas driven by wind speeds above 20 knots.

An additional benefit of multi-hull designs is that they can travel at faster speeds than a mono-hull design. The wave penetrating features of a multi-hull design allow the watercraft to also maintain course and speed during sea conditions that would otherwise defeat a mono-hull's ability to maintain the same course and speed.

As claimed and disclosed in the present inventor's U.S. Pat. Nos. 5,549,066 and 6,883,450 a multi-hull, with each hull having a bow and stern sections that are essentially symmetrical and have wave penetrating features is featured. The bow and stem sections are formed from more than three, preferably five triangular surfaces meeting at meet a common point.

Other various hull designs have been introduced. In an article titled "Variable Draft Broadens SWATH Horizons" in the April 1994 issue of *Proceedings*, improvements are made to the design known as Small Waterplane Area Twin-Hull (SWATH) ships. The SWATH design for this particular boat utilizes struts that are aligned on the centerline of the lower hull. The lower hull's rectangular cross sections enhance seakeeping at deeper drafts and give best propulsion at transit depths. The center bow provides a cushion against slamming and affords convenient overboard access for handling equipment. Rectangular hull forms supportive of the SWATH design are less expensive to fabricate and outfit than conventional hull designs.

The U.S. Navy test vessel, Sea Shadow, was built to test several aspects of maintaining stealthiness at sea, including low radar visibility, quietness to sonar sensors and minimizing wake. An article titled "The Secret Ship" in the October 1993 issue of *Popular Science* discussed the unclassified parameters of this vessel. Above the waterline, the Sea Shadow's resemblance is similar to that of the U.S. Air Force F-117A stealth fighter. From the waterline down, the exact details are classified, but the ship's underwater shape is essentially a SWATH design. A pair of submerged pontoons gives the Sea Shadow its buoyancy. Running beneath the water's choppy surface layer, these pontoons cause far less of the seasickness-inspiring vertical motion inherent in traditional mono-hull designs.

Another unique design is the trimaran hydrofoil designed and built by Greg Ketterman, as discussed in an article titled, "World's Fastest Sailboat," in the January 1991 issue of *Popular Science*. The hydrofoil is a two-mast, triple-hull design that utilizes sensors forward of the outer hulls that hug the water's undulating surface, constantly adjusting the pitch of the hulls and main foils to maintain stability and minimize drag. Foot pedals control the rudder. This design is primarily for sail boats that want to maximize speed through the waters. However, this design is not suitable for large boats and lacks a propulsion system often desired in larger boats.

Ocean Waves, even in relatively calm seas, have amplitudes and lateral modulations. In stormy seas, those amplitudes and modulations often tear multi-hull ships apart. The current propulsion systems for large multi-hull ships lack a mechanism to cope with the up and down movement of the waves, and also lack structure to protect the multi-hull ship from being ripped apart.

Recently, wave piercing designs have been developed which have shown great promise. As disclosed in an article entitled, "Wave Piercers and Fast Cats", written by Richard Akers and published in December/January, 2002 issue of *Professional Boatbuilder*, multiple narrow hulls enable the use of substantially less horsepower to propel the craft than a vessel having similar displacement but with wider multiple hulls or a mono-hull.

The U.S. Navy, among others, is also interested in having speed vessels, some of which have flat decks for use as equipment carrying ships. The desire for higher speed ships as well as ships being more difficult to see on radar is near the top of the Navy's wish list. As example, discussed in the U.S Navy *Proceedings*, January, 2003, the need for a combat littoral ship which is lethal, agile, survivable and versatile is critical if the U.S. is to maintain naval supremacy. However, a catamaran hull design is limited and it lacks the stealth capability and is not self-righting if rolled over.

All of the above are particularly important when attempting to design racing boats. The typical high speed racing hydroplanes are known to have problems of having the bow lifting up due to relative small action which causes the hull to porpoise. The bow lifting causes the stern to dig in further, the engines keep driving the craft forward, and, finally, the boat can become airborne, eventually flipping over on its back. Such crashes frequently cause operators severe injuries and even can be fatal.

A typical mono-hull high performance boat used for offshore racing is about 42 feet long and has a beam of 8 feet. The length and beam are limited to what can be legally hauled over the highway without incurring special wide load permits. The typical boat is a deep V design manufactured from fiberglass or sometimes more exotic materials such as Kevlar. Multiple engines are customarily large block car or truck engines connected to out drives. The cockpit is usually open with at least four seats and harnesses to keep the passengers and operator from being ejected when the boat "porpoises" due to encountering waves.

This type of racing is limited to those having extraordinary amounts of money as the cost of the speedboat, maintenance and fuel is well beyond most people's means. These boats attain speeds of over 170 mph. This type of racing is very dangerous and requires a craft that is able to withstand the enormous pressures and strains that are being placed on the hull, its fittings and the engines. Money is usually of little consequence to those who attain to win one of these offshore races.

Therefore, a multi-hull design for a large boat that protects the speedboat from being ripped apart by the changing amplitudes and modulations of the ocean, is faster than competing craft, can be transported on the nation's highways using a low boy trailer without special permits and a propulsion system that provides a means for optimizing the ship's speed through varying sea conditions ship is desired in the art.

SUMMARY OF THE INVENTION

As the inventor has previously shown, a triangular hull is superior in many respects. The present invention relates to a speedboat design that is multi-hull, with each hull having bow and stern sections that are essentially symmetrical and have wave penetrating features. The nearly identical bow and stern sections are formed from preferably five triangular surfaces meeting at a common point. The polygonal features of the hull design run both athwartships and from stem to stern. The invention also features a plurality of drive pods which are attached to the hull of the apparatus and facilitate adjustability for varying ocean conditions. The multiple drive pods under the hull provide a drive system that has tremendous power for the space utilized. Each engine has synchronized rudders. The craft also features aircraft-type controls having a top mounted "tail assembly" that has a rudder and ailerons and/or elevators.

Therefore, it is an aspect of the present invention to provide a polygonal speedboat hull apparatus that is economical to build, suitable for high performance offshore racing craft such as described above.

It is another aspect of the invention to provide a polygonal speedboat hull apparatus that has dual ended fore and aft wave penetrating features in order to provide added strength compared to other types of wave penetrating hull designs.

It is also an aspect of the invention to provide a speedboat hull apparatus that has stern mounted "tail assembly" with a rudder to assist in turning the craft and either ailerons or elevators to assist in counteracting tendencies to roll or pitch.

It is another aspect of the invention to provide a triangular boat hull apparatus that is both air and water tight, so that in the event of a roll-over, minimum water would enter the vessel.

It is another aspect of the invention to provide a speedboat hull apparatus where the inherent internal triangular design of the hulls prevents the multi-hull boat from being torn apart due to the high speeds encountered during the race.

It is another aspect of the invention to provide a speedboat hull design that has an extra triangular shaped section that is attached to the bottom bow wave-penetrating section to provide greater stability and strength.

Another aspect of the invention is to provide a speedboat hull design such that dual ended fore and aft wave penetrating features prevent the bow of the craft from catching air and flipping over backwards.

It is another aspect of the invention to provide a drive pod that is capable of incorporating gas, diesel, electric, or water jet propulsion engines.

It is another aspect of the invention to provide a drive pod that has multiple engines with each engine having its own propeller and synchronized port and starboard rudders directly aft of the propellers to permit stable yet fast turning.

It is another aspect of the invention to provide each engine in the drive pod with a matched pair of hydro pneumatic cylinders that absorb the pounding from wave action and can be adjusted to meet operating conditions on the ocean.

It is another aspect of the invention to provide a propulsion system for a multi-hull apparatus where multiple drive pods are attached under the hull of the apparatus.

It is a final aspect of the invention to provide a speedboat hull apparatus that has a top deck mounted aircraft-type of rudder and corresponding ailerons to assist in turning the craft.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE INVENTION

Figure 1:
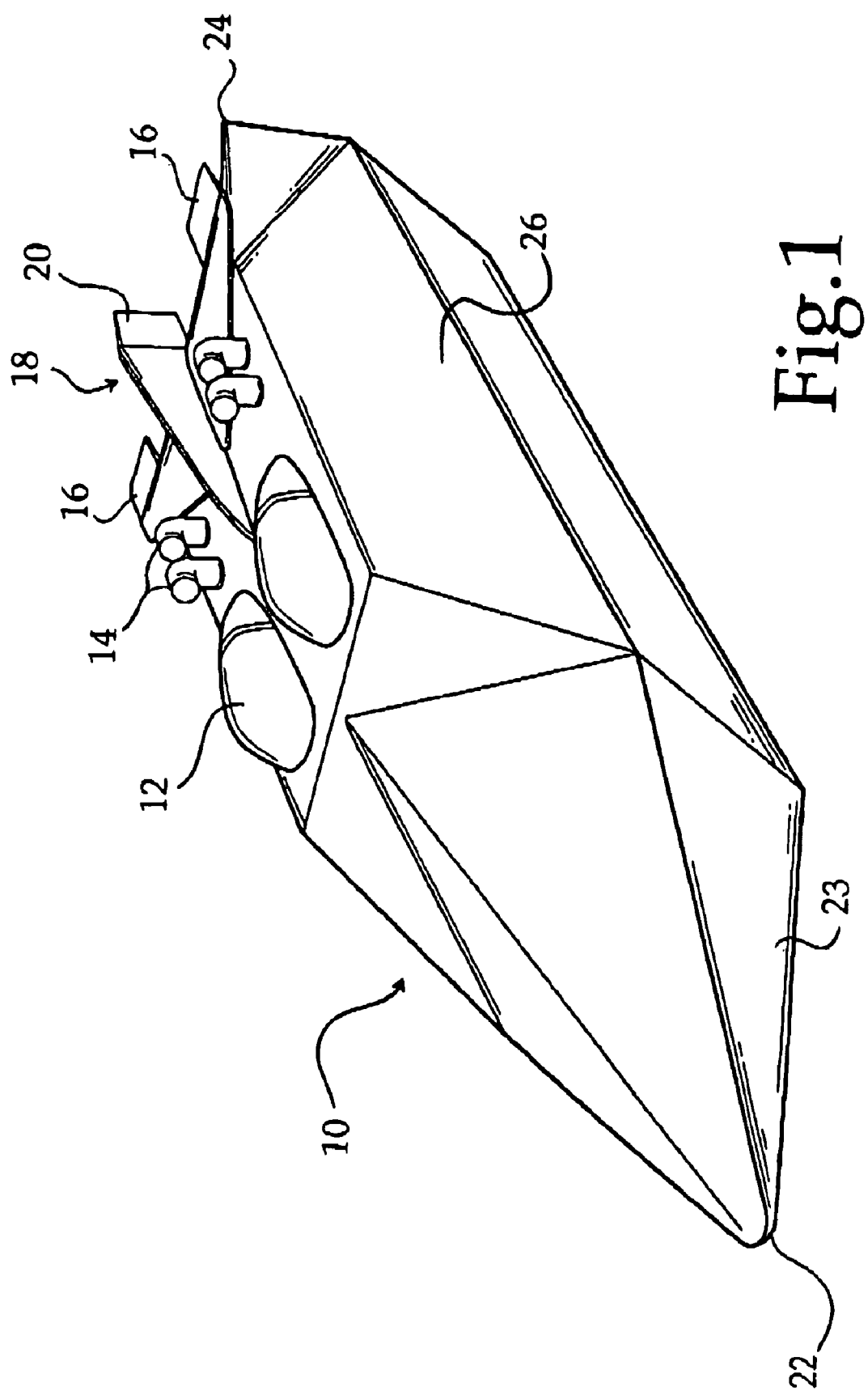
FIG. 1 is a port isometric view of the speedboat hull apparatus in accordance with the invention.

Referring to FIG. 1, the preferred embodiment of speedboat hull design apparatus 10 is shown. The bow 22 features a wave penetrating section and a similar stern section 24. If the design 10 is 48 feet long, the beam would be 9 feet and top to bottom measurement would be 8 feet so that it could be carried on a low boy trailer on the highway. Many of the features of this design are well described in the inventor's above referenced patents and are incorporated herein by reference.

The bow section 22 and the stern section 24 would each be about 12 feet long as measured along the keel 23. The operator and passengers would be seated inside the craft with a view through canopies 12. Air intakes 14 which are on the top of the deck serve to ventilate the cabin as well as provide air intakes for the engines. Center section 26 would be approximately 24 feet long, providing sufficient length to mount up to 4 engines in a series.

An aircraft-type tail assembly 18 is mounted on the centerline on the deck. A large rudder 20 similar to those used on airboats used for tours of Florida's Everglades is provided. Ailerons 16 work in opposition to one another to counteract the tendency of the craft to roll in seaway. However, elevators 16 could be substituted in order to control the pitch motion of the craft. A computer could be used to control both or separate sets of computer controlled elevators and ailerons could also be used.

As previously disclosed by the present inventor, speedboat design hull apparatus 10 can be constructed entirely from flat pieces of material instead of curved sections normally used for hull construction. The preferable material selected for construction is molded fiberglass, Kevlar material and any material suitable for handling the stresses of smaller sized high performance craft. The hull could even be fabricated from new composites not currently known.

The wave penetrating aspects of the hull will be discussed first. Since the hull is essentially bilaterally symmetrical, both from an athwartships perspective as well as from a bow to stern view, the bow sections are preferably substantially the same as the stern sections, excepting the drive pod orientation and the extra reinforcing triangular section 30 in the bow.

Figure 2:
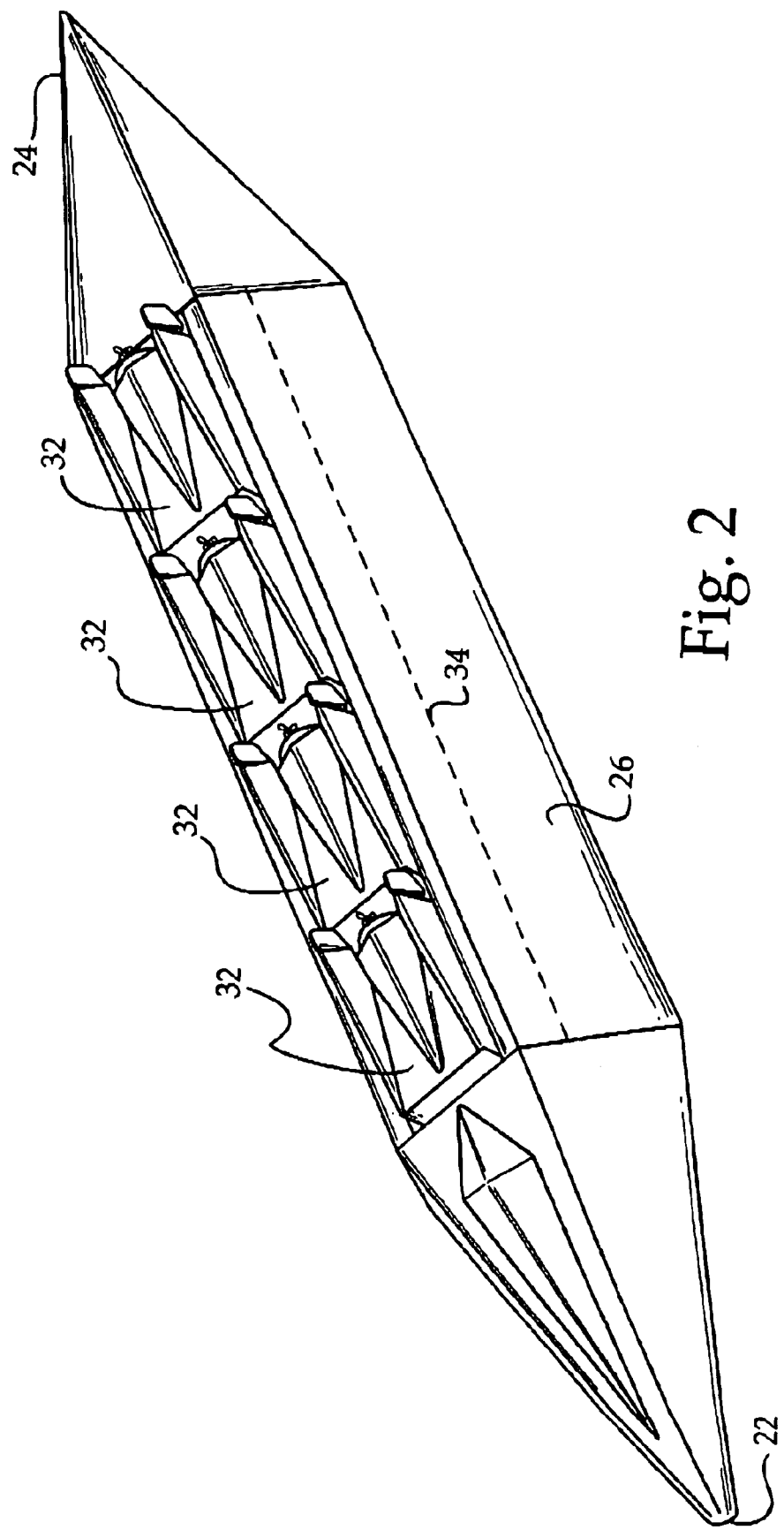
FIG. 2 is a bottom view of the apparatus with the bow facing left.

Each wave penetrating section is made up five panels as shown in FIG. 1. The bow 22 and stern sections 24 are made up of panels meeting at the apex. A plurality of engine pods 32 is affixed within athwart section 26 as shown in FIG. 2. While various power options are possible such as diesel, electric, jet drives, etc., the preferable combination is a two or three bladed propeller attached to a large bore gasoline fueled engine which is likely to provide the best thrust to engine weight ratio. This also corresponds to the power combination used by typical offshore racers. However, apparatus 10, due to the design, can be configured to utilize four engines while the typical racer is limited to two or three. The expected water line 23 is about 1½ feet above the base of section 26 so the craft will draw little water. Of course, this minimum depth is attained only when each pod 32 is in the fully up position (see FIG. 4.)

Figure 3:
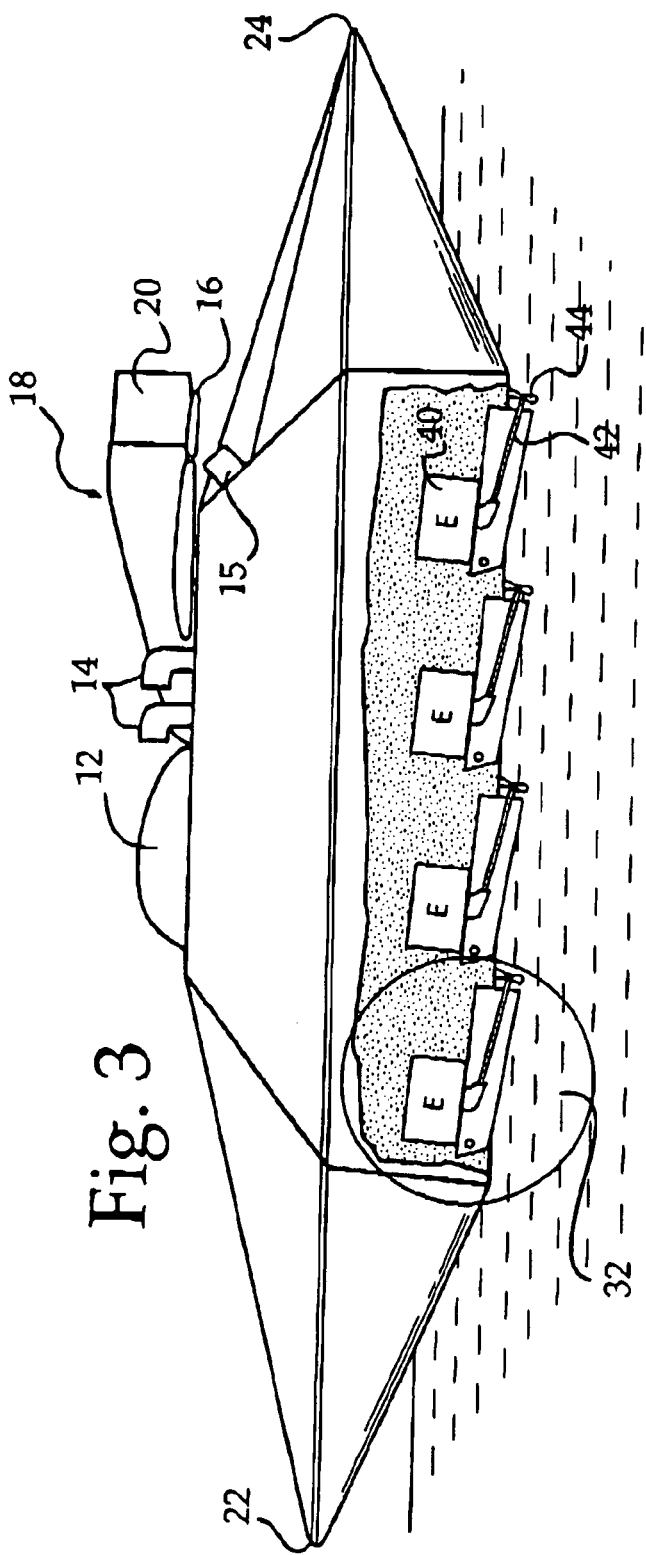
FIG. 3 is a cutaway illustration showing one row of engines mounted the craft, stern view.

As illustrated in FIG. 3, the four engine pods 32 are mounted serially. Each engine 40 is preferably a large bore gas internal combustion engine. The exhaust from these engines 40 exits pipes 15 or could be designed to exit underwater (not shown) as is well known in the art.

Each engine 40 is fitted with a drive shaft 42 and propeller 42 which can be either a two to five bladed propeller depending on the design characteristics of the engine and expected torque and top end speed of the craft.

Figure 4:
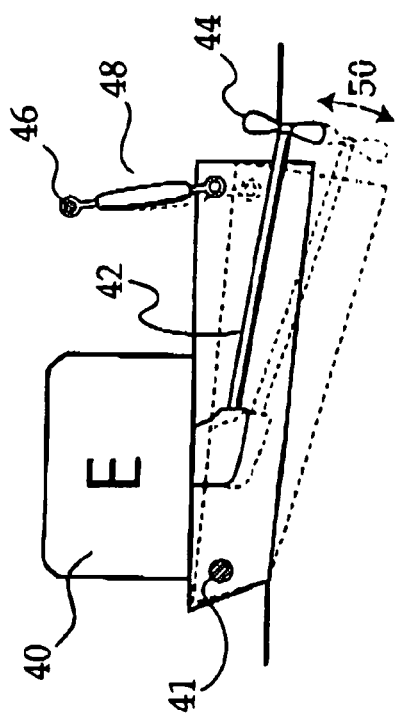
FIG. 4 is a side illustration of a typical engine as it is mounted in the craft.

As shown in FIG. 4, each engine pod 32 is provided with a pivot 41 and a hydraulic shock absorber 48 attached via a second pivot 46 so that pod 32 can be withdrawn into or lowered from the craft. This feature enables the craft to ride high on a plane when going full speed.

Figure 5:
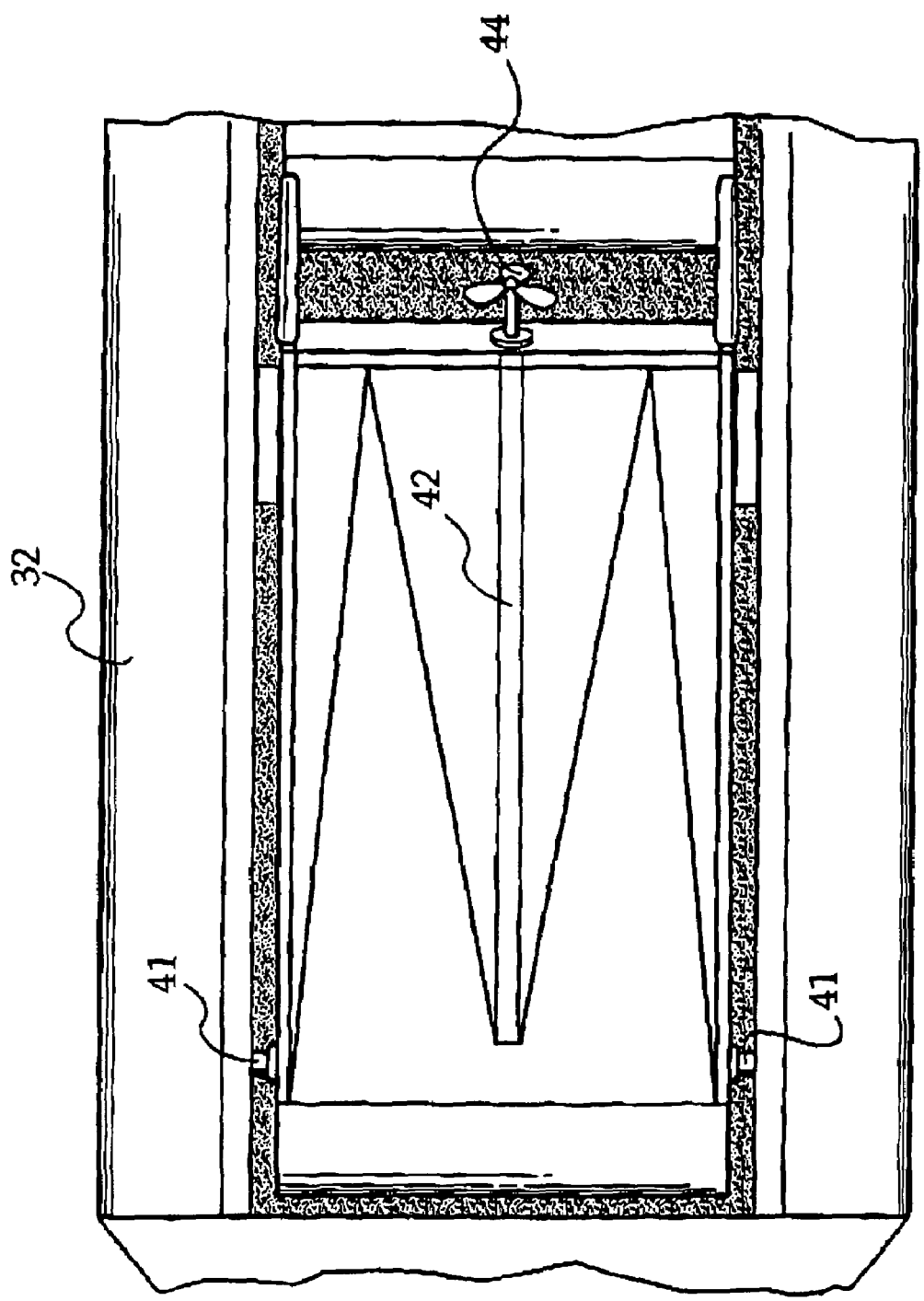
FIG. 5 is a detailed bottom view of a typical engine as it is mounted in the craft, top view.
Figure 6:
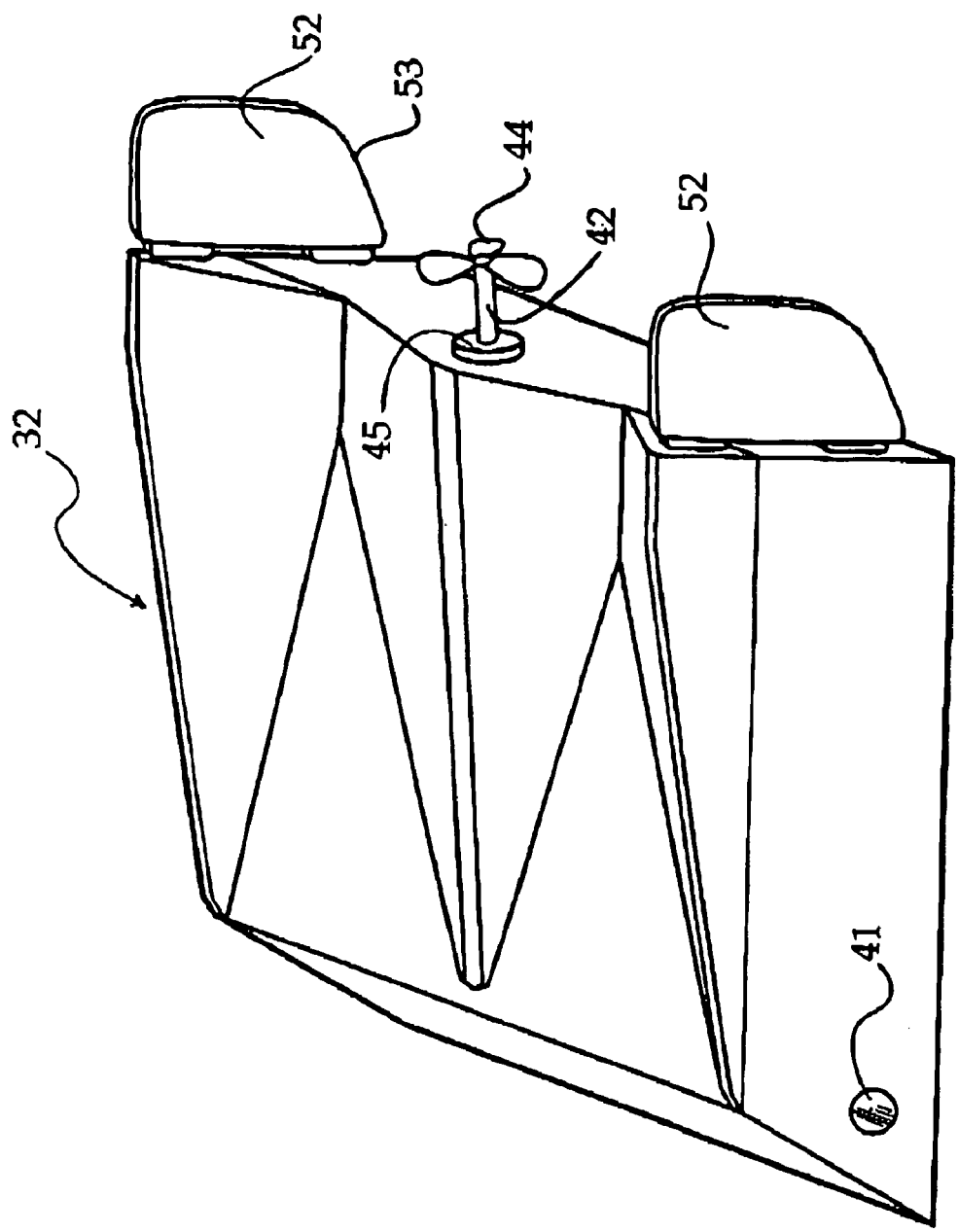
FIG. 6 is an isometric view of a single drive pod showing the attached rudders.

As shown in FIGS. 5 and 6, each pod 32 has twin rudders 52 which are synchronized using techniques well known in the art to turn the craft to the port or starboard direction. As shown, shaft 42 with the attached prop 44 is mounted through stuffing box 45, which again is well known in the art.

Note that bottom curvature 53 of each rudder 52 is provided so that the respective engine pods 32 can be nested closely together.

The fore and aft polygonal shapes used to provide the wave penetrating sections improve the strength of multi-hull apparatus 10 in both compression and tension so that heavy sea conditions will not buckle and pull apart multi-hull apparatus 10. The dimensions and angles provided for the various sections can vary to correspond with other dimensions selected for the desired size of triangular boat hull apparatus 10 to be built. Accordingly, the corresponding wave penetrating sections will be scaled appropriately using techniques well known in the ship building arts. A typical offshore racer will have the approximate dimensions as described above.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A multi-hull speedboat apparatus having an axis coincident with the direction of travel, said apparatus comprising:
   a bow section and a stern wave section; wherein said bow section and said stern section are substantially the same; and
   an athwart section wherein said bow section, said stern section and said athwart section make said apparatus bilaterally symmetrical as well as fore and aft symmetrical when viewed amidships; and
   said bow section further comprising at least four triangular panels meeting a common point and said stern wave section further comprising at least four triangular panels meeting a common point such that the common point of said bow section and the common point of said stern wave section are aligned to define a hull section axis that is substantially parallel to the axis of the direction of travel wherein said athwart section further comprises a tail assembly having a rudder and at least one of a pair of ailerons or a pair of elevators.

2. A multi-hull speedboat apparatus having an axis coincident with the direction of travel, said apparatus comprising:
   a bow section and a stern wave section; wherein said bow section and said stern section are substantially the same; and
   an athwart section wherein said bow section, said stern section and said athwart section make said apparatus bilaterally symmetrical as well as fore and aft symmetrical when viewed amidships; and
   said bow section further comprising at least four triangular panels meeting a common point and said stern wave section further comprising at least four triangular panels meeting a common point such that the common point of said bow section and the common point of said stern wave section are aligned to define a hull section axis that is substantially parallel to the axis of the direction of travel; and
   said athwart section has a plurality of propulsion units aligned along the direction of travel wherein each propulsion unit has a pair of synchronized rudders positioned at the stern end of said propulsion unit.

* * * * *